US010298167B2

(12) United States Patent
Tanaka et al.

(10) Patent No.: US 10,298,167 B2
(45) Date of Patent: May 21, 2019

(54) MOTOR CONTROLLER HAVING FUNCTION OF DETERMINING POWER FAILURE DETECTION CONDITION

(71) Applicant: FANUC CORPORATION, Yamanashi (JP)

(72) Inventors: Shunpei Tanaka, Yamanashi (JP); Kenta Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/458,084

(22) Filed: Mar. 14, 2017

(65) Prior Publication Data

US 2017/0279399 A1 Sep. 28, 2017

(30) Foreign Application Priority Data

Mar. 25, 2016 (JP) .................................. 2016-062678

(51) Int. Cl.
*H02P 29/024* (2016.01)
*H02P 27/06* (2006.01)
*H02H 1/00* (2006.01)

(52) U.S. Cl.
CPC ............. *H02P 29/025* (2013.01); *H02H 1/00* (2013.01); *H02P 27/06* (2013.01)

(58) Field of Classification Search
CPC .... H02P 29/024; H02P 1/029; H02P 29/0243; H02P 8/36; H02P 29/025; H02H 7/08; H02H 3/13; H02H 3/253
See application file for complete search history.

(56) References Cited

U.S. PATENT DOCUMENTS

| 8,030,878 B2 * | 10/2011 | Iwashita ................ G01R 31/42 318/779 |
| 2012/0098475 A1 * | 4/2012 | Noguchi ............... H02P 29/025 318/479 |
| 2013/0134910 A1 * | 5/2013 | Iwashita ................... H02P 3/14 318/376 |

FOREIGN PATENT DOCUMENTS

| JP | 1170314 A | 7/1989 |
| JP | 2004173333 A | 6/2004 |
| JP | 2004229410 A | 8/2004 |
| JP | 2011155803 A | 8/2011 |
| JP | 5283752 B2 | 9/2013 |

OTHER PUBLICATIONS

English Abstract and Machine Translation for (US 20120098475 A1) Japanese Publication No. 5283752 B2, published Sep. 4, 2013, 18 pgs.

(Continued)

*Primary Examiner* — Bickey Dhakal
(74) *Attorney, Agent, or Firm* — Fredrikson & Byron, P.A.

(57) ABSTRACT

A motor controller includes a rectifier for converting AC power supplied from an AC power supply into DC power and outputting the DC power; an AC voltage detector for detecting an AC voltage value of the AC power supply and outputting the AC voltage value as a detection value; a power failure detector for determining that a power failure is occurring, when a state in which the outputted detection value is equal to or lower than a regulation voltage has continued for a regulation time or more; and a power failure detection condition determiner for determining or modifying the regulation time.

3 Claims, 6 Drawing Sheets

(56) References Cited

OTHER PUBLICATIONS

English Abstract and Machine Translation for Japanese Publication No. 2011-155803 A, published Aug. 11, 2011, 8 pgs.
English Abstract and Machine Translation for Japanese Publication No. 2004-229410 A, published Aug. 12, 2004, 15 pgs.
English Abstract and Machine Translation for Japanese Publication No. 2004-173333 A, published Jun. 17, 2004, 16 pgs.
English Abstract and Machine Translation for Japanese Publication No. JPH01-170314 A, published Jul. 5, 1989, 7 pgs.

* cited by examiner

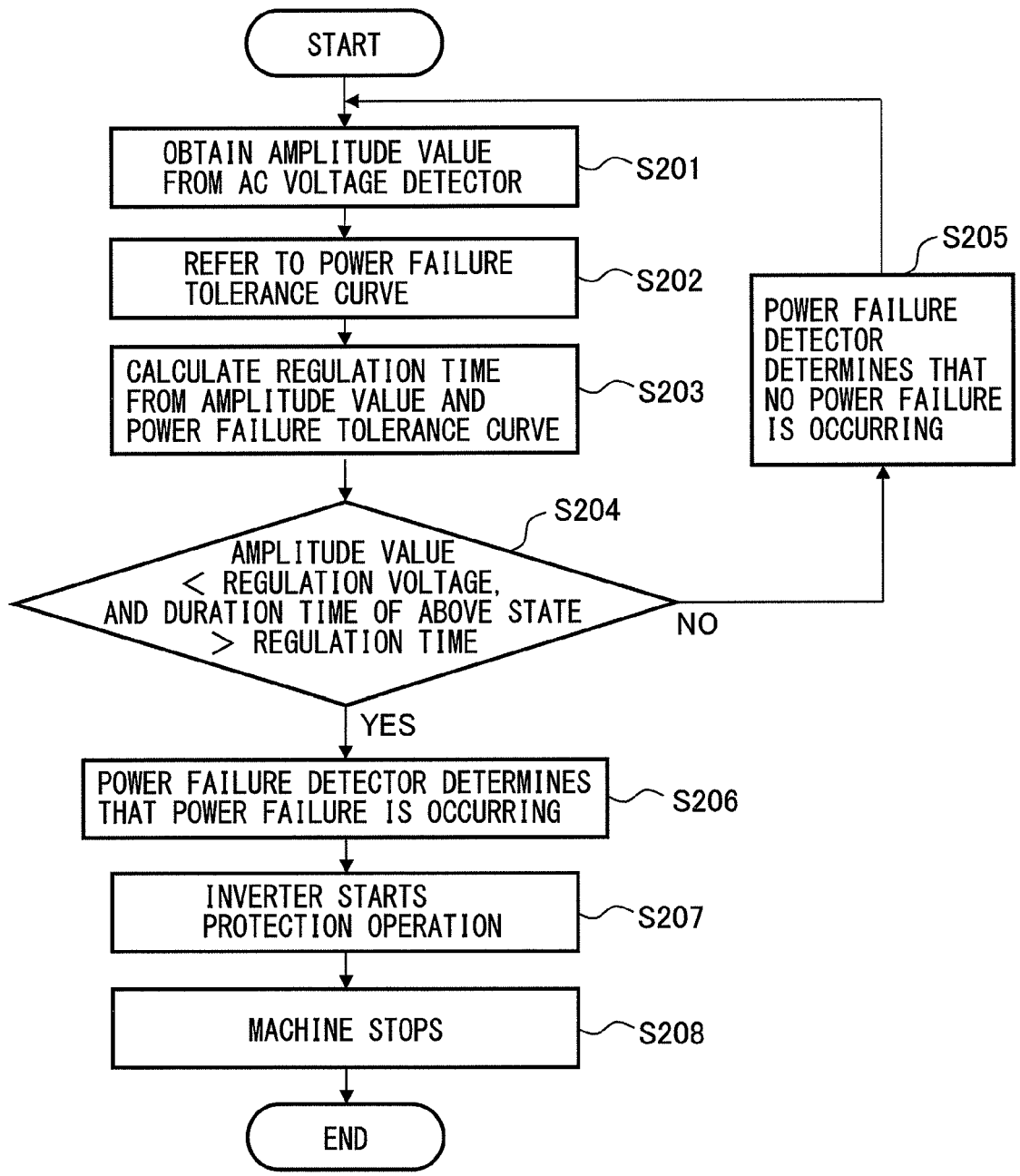

MOTOR CONTROLLER HAVING FUNCTION OF DETERMINING POWER FAILURE DETECTION CONDITION

This application is a new U.S. patent application that claims benefit of JP 2016-062678 filed on Mar. 25, 2016, the content of 2016-062678 is incorporated herein by reference.

BACKGROUND OF THE INVENTION

1. Field of the Invention

The present invention relates to a motor controller, and more specifically relates to a motor controller having the function of determining or modifying a condition for detecting a power failure of a power supply.

2. Description of Related Art

In cases of power failure that prevents the continuation of the normal operations of motor controllers and peripheral devices thereof, machines using the motor controllers are failed. Thus, the motor controllers generally include power failure detection means and perform protection operations to stop the machines before the continuation of the normal operations is hindered.

The amount of energy that is required for continuing the normal operations of the motor controller and the peripheral devices thereof, in cases of power failure, is referred to as a "power failure tolerance". The upper limit of time to detect a power failure is defined as an "upper limit regulation time". A voltage to detect a power failure by a reduction in a power supply voltage is defined as a "regulation voltage". Although the upper limit regulation time and the regulation voltage depend on the "power failure tolerance", the "power failure tolerance" varies from machine to machine. Thus, the upper limit regulation time and the regulation voltage are each required to be determined differently from machine to machine.

Therefore, a method for selectable switching a regulation time among a plurality of time threshold values by an electric selection circuit provided in a motor controller is proposed (for example, Japanese Patent No. 5283752, hereinafter called "patent document 1"). In the invention described in the patent document 1, a voltage threshold value and the time threshold value are defined as a power failure detection threshold value. A control voltage during a power failure varies differently depending on whether or not a motor acts as a generator. Thus, the patent document 1 proposes a method for selectable switching the detection threshold value from the two detection threshold values using the electric selection circuit.

Also, a motor control method in which when a detected power supply voltage is equal to or lower than a predetermined threshold value, the power supply is determined to be shut down and the operation state of a motor at the time of the shutdown is stored in a nonvolatile memory device is proposed (for example, Japanese Unexamined Patent Publication (Kokai) No. 2004-229410, hereinafter called "patent document 2"). In this method, a threshold value is varied depending on a load of the motor. However, the patent document 2 does not disclose a threshold value associated with time.

Also, a method in which the relationship between a power failure tolerance and a voltage amplitude is measured to detect a power failure is known (for example, Japanese Unexamined Patent Publication (Kokai) No. 2011-155803, hereinafter called "patent document 3"). However, the patent document 3 does not concretely describe a means for changing the relationship between the power failure tolerance and the voltage amplitude, though the relationship between the power failure tolerance and the voltage amplitude varies from machine to machine.

As described above, since the "power failure tolerance" is different from machine to machine, the conventional techniques that store a number of detection results and perform switching require complicated circuit configurations. This causes an increase in cost and size of a motor controller.

SUMMARY OF THE INVENTION

The present invention aims at providing a motor controller that can determine or modify a power failure detection condition optimally depending on a machine, while preventing problems such as an increase in cost and size owing to a complicated circuit configuration, and, when a power supply voltage drops, minimizes the frequency of stopping the machine in order to improve availability.

A motor controller according to an embodiment of the present invention includes a rectifier for converting alternating-current (AC) power supplied from an AC power supply into direct-current (DC) power and outputting the DC power; an AC voltage detector for detecting an AC voltage value of the AC power supply and outputting the AC voltage value as a detection value; a power failure detector for determining that a power failure is occurring, when a state in which the outputted detection value is equal to or lower than a regulation voltage has continued for a regulation time or more; and a power failure detection condition determiner for determining or modifying the regulation time.

BRIEF DESCRIPTION OF THE DRAWINGS

The objects, features, and advantages of the present invention will be more apparent from the following description of embodiments in conjunction with the attached drawings, wherein:

FIG. 6 is a flowchart of the operation of the motor controller according to the second embodiment of the present invention.

DETAILED DESCRIPTION OF THE INVENTION

A motor controller according to the present invention will be described below with reference to the drawings.

[First Embodiment]

Figure 1:
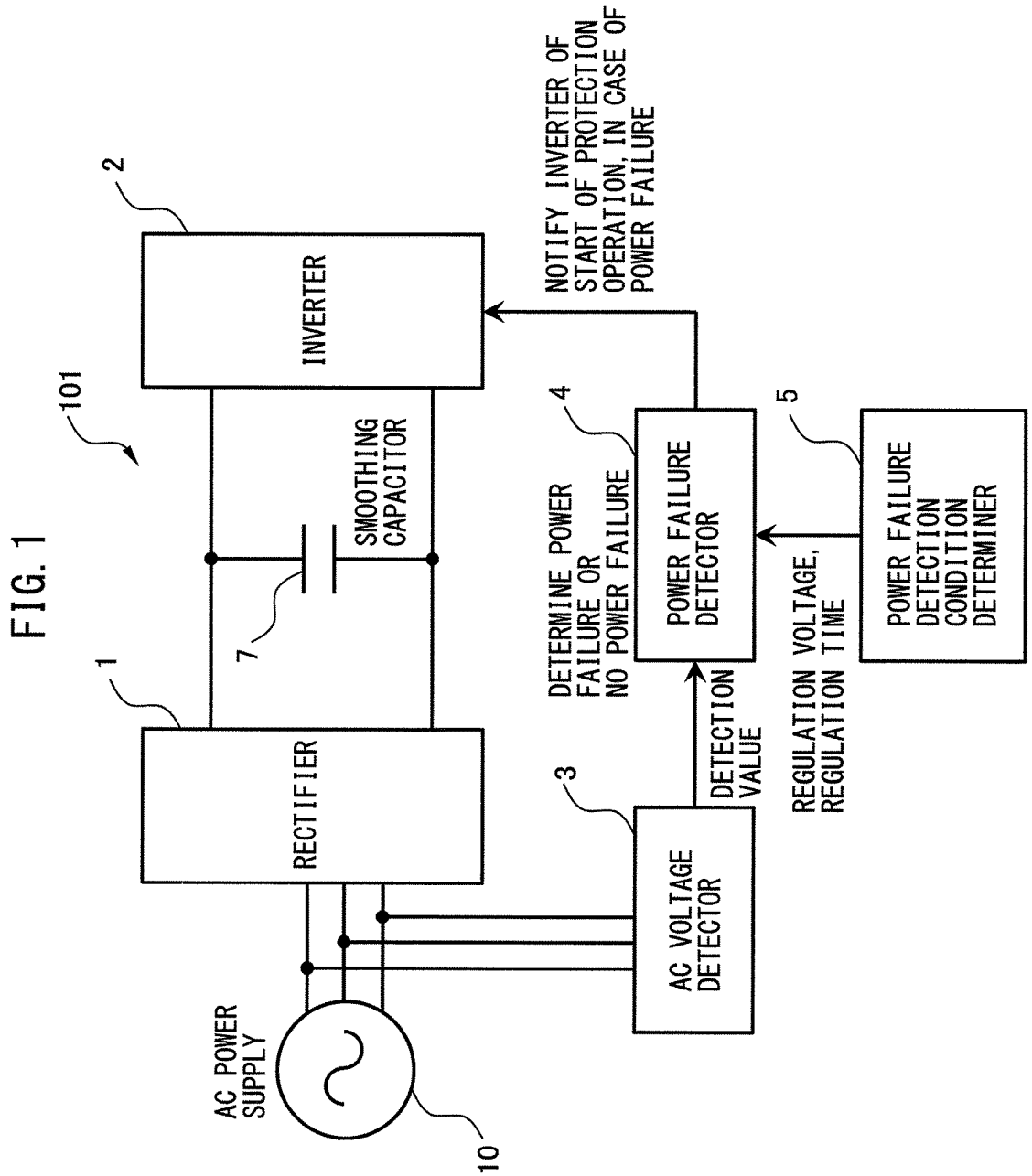
FIG. 1 is a block diagram of a motor controller according to a first embodiment of the present invention.

A motor controller according to a first embodiment of the present invention will be described. FIG. 1 is a block diagram of the motor controller according to the first embodiment of the present invention. A motor controller 101 according to the first embodiment of the present invention includes a rectifier 1, an AC voltage detector 3, a power failure detector 4, and a power failure detection condition determiner 5.

The rectifier 1 converts AC power supplied from an AC power supply 10 into DC power, and outputs the DC power. A smoothing capacitor 7 is provided in a DC link circuit on a DC output side of the rectifier 1.

The motor controller 101 according to the first embodiment of the present invention may further include an inverter 2. The DC power outputted from the rectifier 1 is smoothed by the smoothing capacitor 7, and then supplied to the inverter 2. The inverter 2 converts the DC power outputted from the rectifier 1 into desired AC power. The inverter 2 includes power devices (not shown) that constitute upper and lower arms. The inverter 2 converts the DC power into the AC power to drive a motor (not shown) by the switching of the power devices. The AC voltage detector 3 detects the AC voltage value of the AC power supply 10, and outputs the AC voltage value to the power failure detector 4 as a detection value. Furthermore, the AC voltage detector 3 may convert the detection value into an amplitude value. As the AC power supply 10, a three-phase AC power supply may be used. As a method for converting the detection value of three-phase AC power supply voltage into an amplitude value, a method for calculating the peak value of the detection value, a method for calculating a vector norm converted from three phases into two phases, and the like are usable. As the AC power supply 10, a single phase AC power supply may be used. In the case of single phase AC power supply voltage, there are a method for calculating the peak value of the detection value, and the like.

The power failure detector 4 determines that a power failure is occurring, when a state in which the outputted detection value is equal to or lower than a regulation voltage has continued for a regulation time or more. A "power failure detection time" is defined as a time between a drop in the voltage detection value of the AC power supply 10 to a level lower than the regulation voltage and a determination whether or not a power failure is occurring. An "upper limit regulation time" is a time determined depending on a machine, and represents the upper limit value of the power failure detection time. The "regulation voltage" is a voltage value to determine whether or not a power failure is occurring. When there is a drop in the voltage detection value of the AC power supply 10 to the level lower than the regulation voltage, the power failure detector 4 starts determining whether or not a power failure is occurring. When the voltage detection value of the AC power supply 10 rises to the regulation voltage or more within the regulation time, the power failure detector 4 determines that no power failure is occurring. On the other hand, if the voltage detection value of the AC power supply 10 is lower than the regulation voltage at a point in time when the regulation time has elapsed, the power failure detector 4 determines that a power failure is occurring. When the power failure is determined to be occurring, the power failure detector 4 notifies (inputs to) the inverter 2 of a command (protection operation start command) to start a protection operation for the machine. A method for determining a power failure will be described later in detail.

The power failure detection condition determiner 5 determines the regulation time depending on a power failure tolerance, i.e., the amount of energy that is required for continuing the normal operations of the motor controller 101 and peripheral devices thereof. Moreover, the power failure detection condition determiner 5 may determine the regulation voltage depending on the power failure tolerance.

Figure 2:
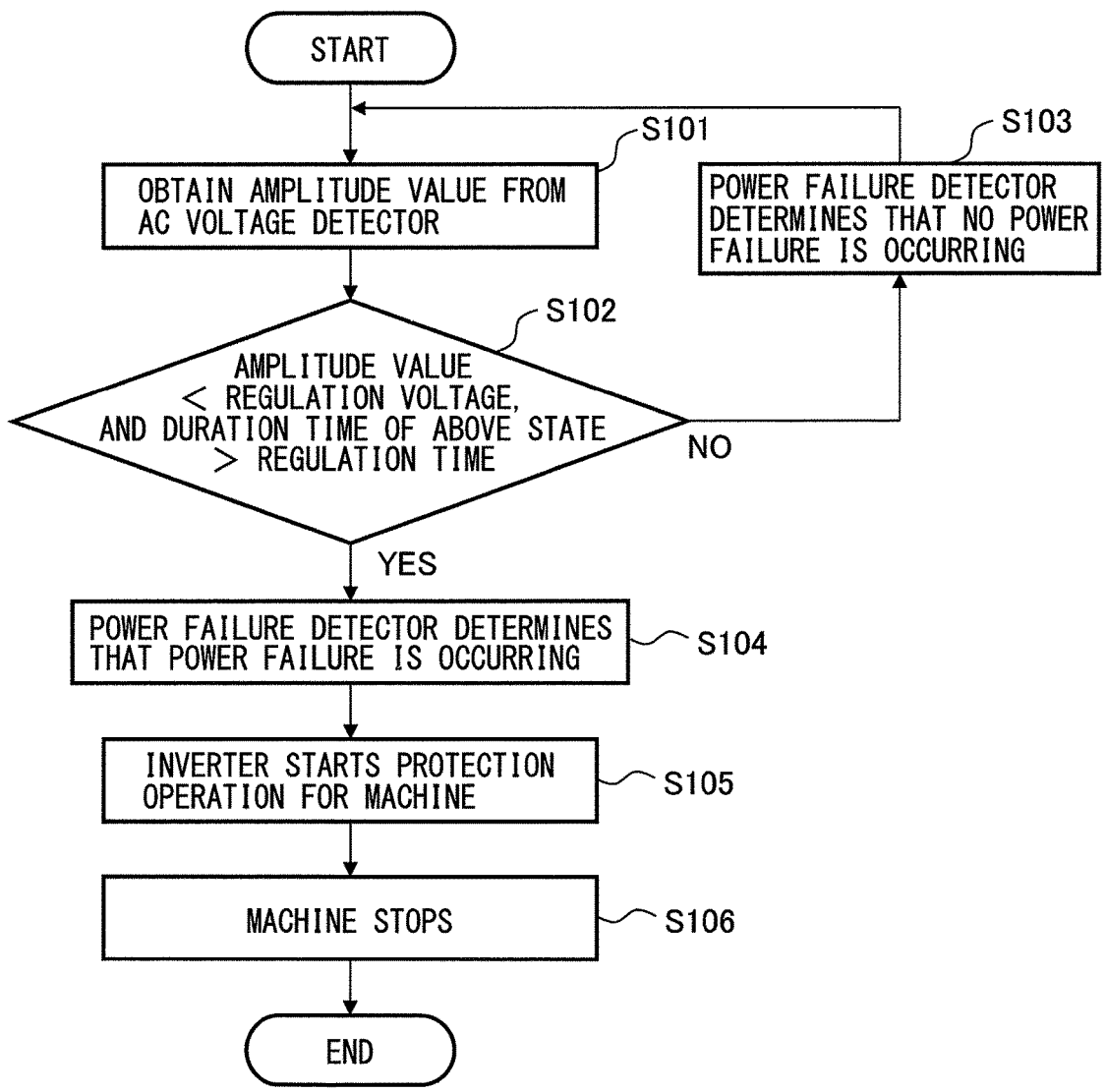
FIG. 2 is a flowchart of the operation of the motor controller according to the first embodiment of the present invention.

Next, the operation of the motor controller according to the first embodiment of the present invention will be described with reference to a flowchart of FIG. 2. First, in step S101, the power failure detector 4 obtains an amplitude value from the AC voltage detector 3.

Next, in step S102, the power failure detector 4 determines whether or not a power failure is occurring (a power failure state or no power failure state). That is, the power failure detector 4 first determines whether or not the amplitude value is lower than the regulation voltage (amplitude value<regulation voltage). If the amplitude value is lower than the regulation voltage, the power failure detector 4 determines whether or not the duration time of this state exceeds the regulation time (duration time of above state>regulation time).

When the amplitude value is equal to or higher than the regulation voltage, or although the amplitude value once dropped to a level lower than the regulation voltage, the amplitude value has risen to a level equal to or higher than the regulation voltage before the regulation time elapses, in step S103, the power failure detector 4 determines that no power failure is occurring (no power failure state). As an example of an instance where although the amplitude value once dropped to a level lower than the regulation voltage, the amplitude value has risen to a level equal to or higher than the regulation voltage before the regulation time elapses, there is an instantaneous power failure. In the instantaneous power failure, since the motor controller can be operated normally, the power failure detector 4 determines that no power failure is occurring.

On the other hand, when the amplitude value is lower than the regulation voltage, and the continuation of this state exceeds the regulation time, in step S104, the power failure detector 4 determines that a power failure is occurring. When the power failure is determined to be occurring, the power failure detector 4 notifies (inputs to) the inverter 2 of the command (protection operation start command) to start the protection operation for the machine.

Next, in step S105, the inverter 2 starts the protection operation for the machine. After that, in step S106, the motor controller 101 controls the motor and the peripheral devices thereof for driving the machine, to stop the machine.

Figure 3:
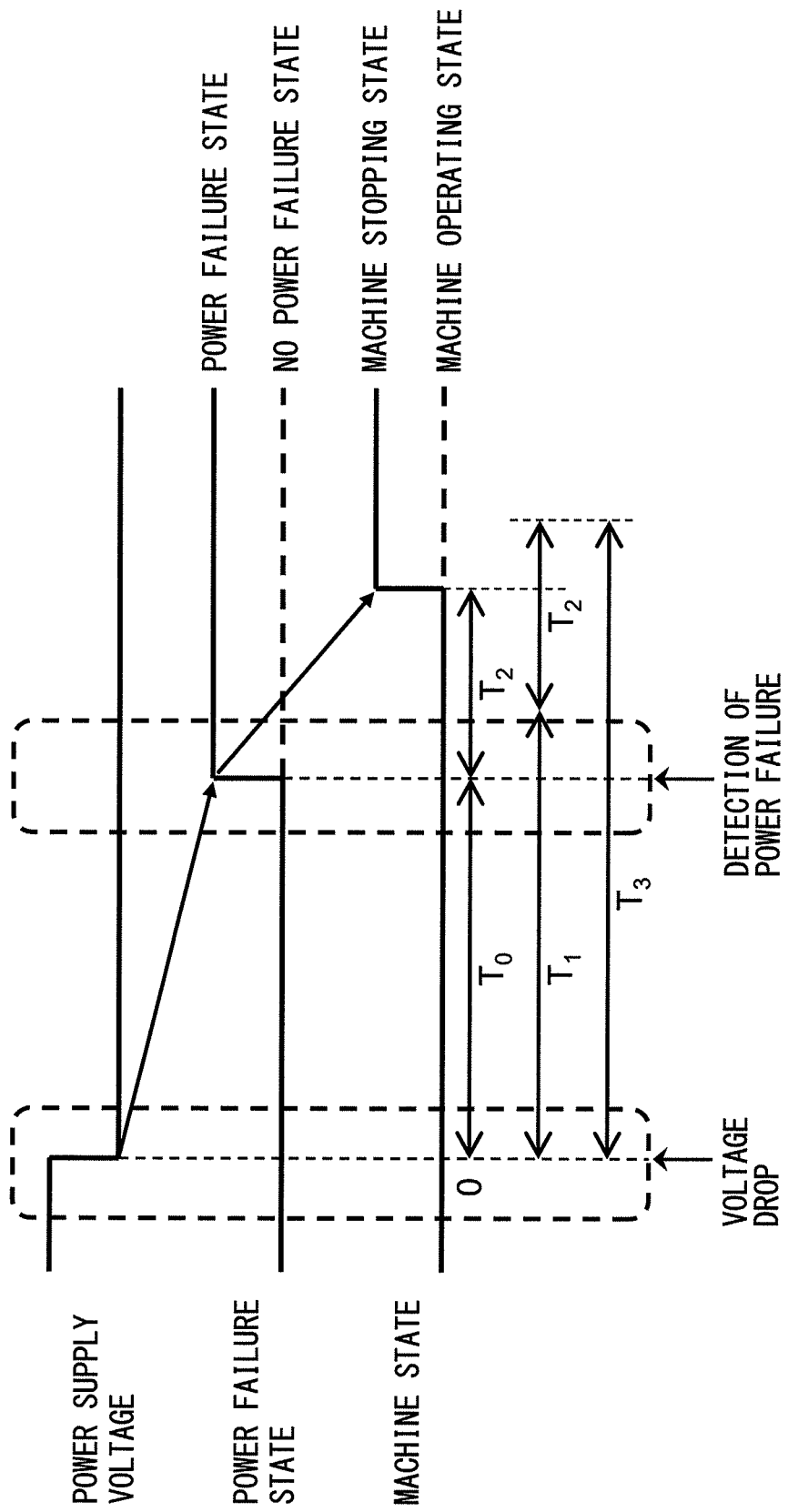
FIG. 3 is a timing chart showing variations with time in a power supply voltage, a power failure state, and a machine state in the motor controller according to the first embodiment of the present invention.

Next, a method for determining the presence or absence of a power failure will be described. FIG. 3 is a timing chart showing variations with time in a power supply voltage, a power failure state, and a machine state in the motor controller according to the first embodiment of the present invention.

The power failure detector 4 detects a voltage drop state in which the detection value (for example, amplitude value) of the power supply voltage of the AC power supply 10 detected by the AC voltage detector 3 is lower than the regulation voltage, at a certain point in time (time 0). The power failure detector 4 measures a power failure detection time, i.e., the duration time of the state in which the detection value of the power supply voltage is lower than the regulation voltage, by designating that point in time as a starting point.

When the power failure detection time has reached the regulation time $T_0$, the power failure detector 4 determines that a power failure is occurring. At this time, a signal indicating the power failure state is switched from the no power failure state to the power failure state, and the power failure detector 4 outputs a command to start the protection operation for the machine to the inverter 2. Thus, an arrival of the power failure detection time at the regulation time $T_0$ triggers the start of the protection operation.

$T_2$ represents a certain time required between a start of the protection operation and a stop of the machine. The machine stops, when $T_2$ has elapsed from when the inverter 2 received the command to start the protection operation from the power failure detector 4.

A time $T_3$ between the detection by the power failure detector 4 of the voltage drop state in which the detection value of the power supply voltage is lower than the regulation voltage and the stop of the machine is a time to normally stop the operations of the motor controller and the peripheral devices thereof under control.

Therefore, to make sure the machine is stopped by the protection operation when a power failure is determined to be occurring, the regulation time $T_0$ is required to be set shorter than $T_1$. $T_1$ is the upper limit of the regulation time (upper limit regulation time) represented by $T_1=T_3-T_2$. The regulation time $T_0$ is specified in the range of $0<T_0<T_1$.

On the other hand, since the machine can withstand an instantaneous power failure shorter than the upper limit $T_1$ of the regulation time, the regulation time $T_0$ is preferably set at a value as close to $T_1$ as possible. Setting such a regulation time minimizes the frequency of stopping the machine, when the power supply voltage drops, thus improving the availability of the machine.

[Second Embodiment]

Figure 4:
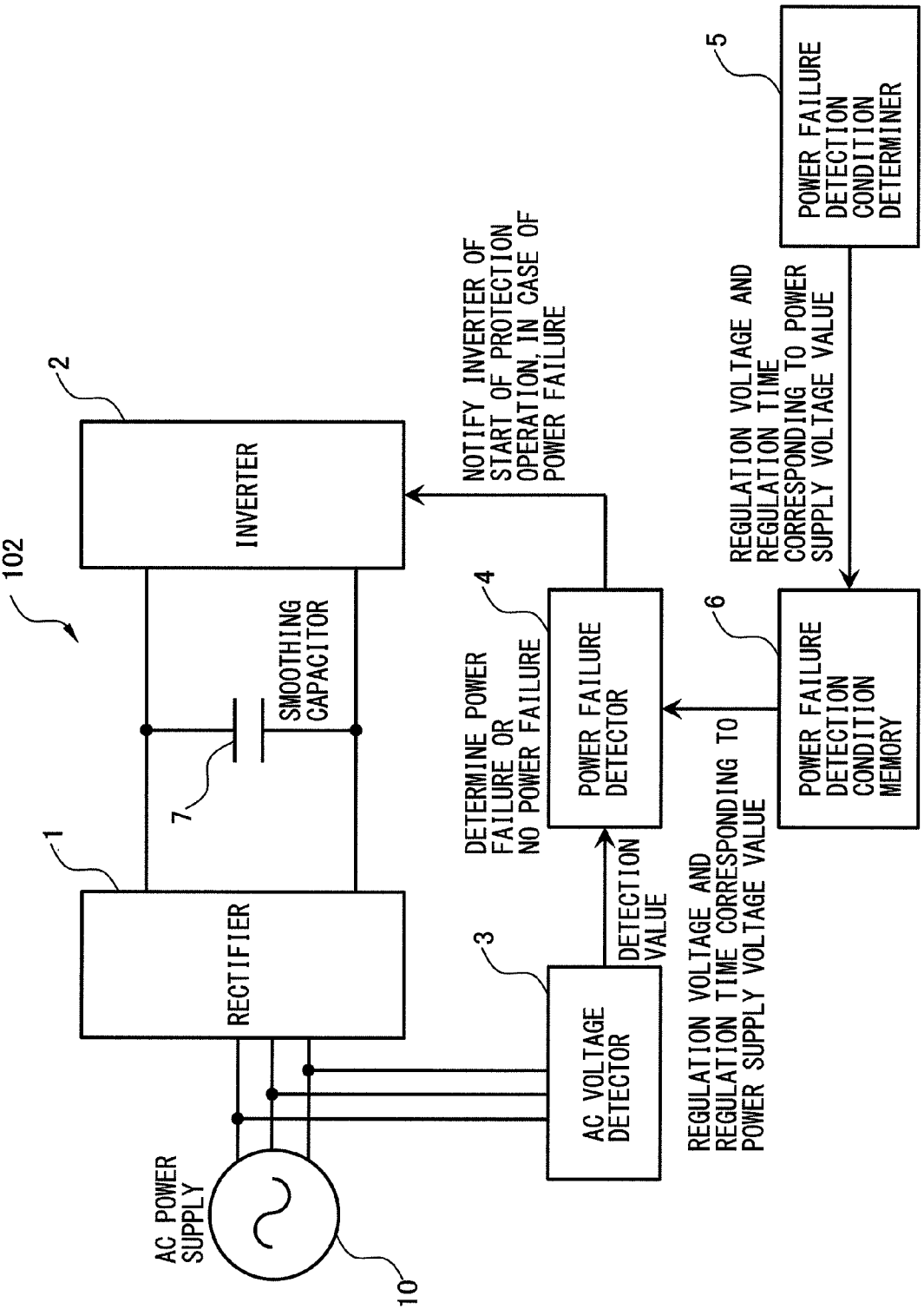
FIG. 4 is a block diagram of a motor controller according to a second embodiment of the present invention.

Next, a motor controller according to a second embodiment of the present invention will be described. FIG. 4 is a block diagram of the motor controller according to the second embodiment of the present invention. The difference between a motor controller 102 according to the second embodiment and the motor controller 101 according to the first embodiment is that the power failure detection condition determiner 5 modifies the regulation time in accordance with the power supply voltage of the AC power supply 10. The other configuration of the motor controller 102 according to the second embodiment is the same as that of the motor controller 101 according to the first embodiment, so a detailed description is omitted.

The power failure detection condition determiner 5 modifies the regulation time depending on the power supply voltage supplied from the AC power supply 10. The power failure detection condition determiner 5 preferably determines the detailed or changeable power failure detection time (for example, in time units of 1 [msec]), in order to minimize the frequency of stopping the machine.

Figure 5:
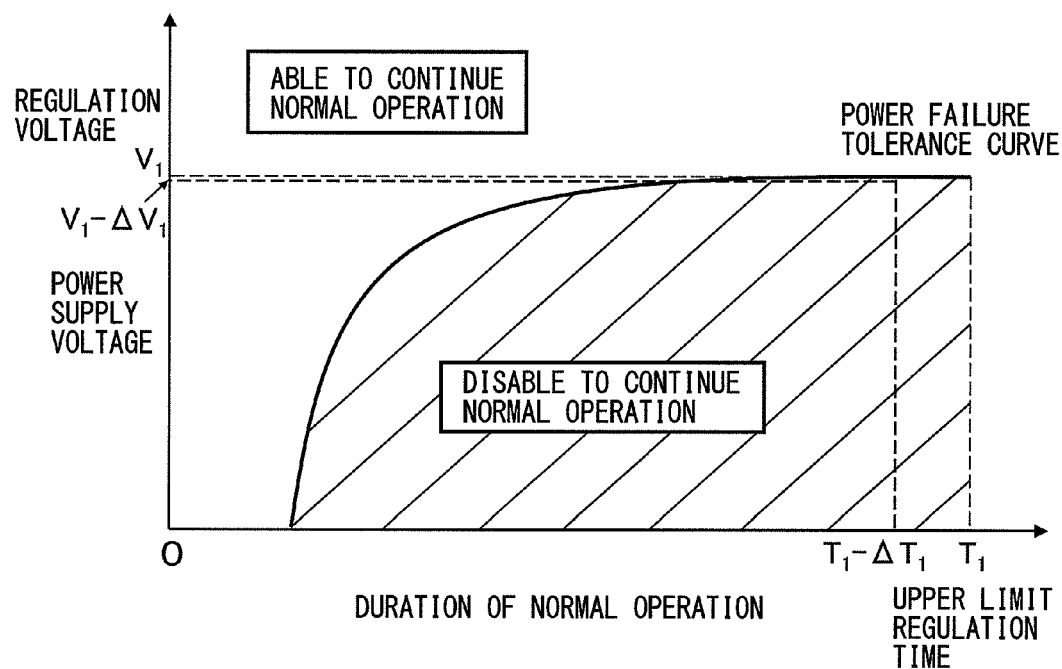
FIG. 5 is a graph of a power failure tolerance curve of the motor controller according to the second embodiment of the present invention.

Even if the AC power supply 10 stops power supply to the inverter 2, the motor can be operated normally for a certain period of time by power stored in the smoothing capacitor 7. The duration of the normal operation depends on the power supply voltage from the AC power supply 10. FIG. 5 shows a power failure tolerance curve that shows the relationship between the power supply voltage and the duration of the normal operation. In FIG. 5, a vertical axis represents the power supply voltage of the AC power supply 10, and a horizontal axis represents the duration of the normal operation. A power failure is required to be detected in this time range. That is, the horizontal axis corresponds to the upper limit regulation time $T_1$.

For example, in FIG. 5, when the power supply voltage drops to 70% of the regulation voltage, the normal operation can be performed until 10 [msec]. When the power supply voltage drops to 0% of the regulation voltage, the normal operation can be performed until 3 [msec]. As described above, the duration of the normal operation depends on the power supplied from the AC power supply 10. Thus, when the power supply voltage is equal to or higher than a threshold value determined from the power failure tolerance curve, the machine can continue the normal operation, thus being determined as no power failure. On the other hand, when the power supply voltage is lower than the threshold value determined from the power failure tolerance curve (a diagonally shaded area in FIG. 5), the machine cannot continue the normal operation, thus being determined as a power failure.

When the power supply voltage drops from the regulation voltage $V_1$ by $\Delta V_1$, the duration of the normal operation is reduced from the upper limit regulation time $T_1$ by $\Delta T_1$. When the power supply voltage drops to a level lower than the voltage threshold value $V_1$, the power failure detection condition determiner 5 modifies the regulation time to a lower value. Therefore, it is possible to perform the protection operation more appropriately depending on the power failure tolerance of the machine.

The regulation time may be modified according to the power failure tolerance curve, or modified stepwise from a representative point of the power failure tolerance curve.

Next, the operation of the motor controller according to the second embodiment of the present invention will be described with reference to a flowchart of FIG. 6. First, in step S201, the power failure detector 4 obtains an amplitude value from the AC voltage detector 3.

Next, in step S202, the power failure detector 4 refers to a power failure tolerance curve.

Next, in step S203, the power failure detector 4 calculates a regulation time from the amplitude value of the power supply voltage and the power failure tolerance curve.

Next, in step S204, the power failure detector 4 determines whether a power failure is occurring or not (no power failure). In other words, the power failure detector 4 first determines whether or not the amplitude value is lower than the regulation voltage (amplitude value<regulation voltage). If the amplitude value is lower than the regulation voltage, the power failure detector 4 determines whether or not the duration time of this state exceeds the regulation time (duration time of above state>regulation time).

When the amplitude value is equal to or higher than the regulation voltage, or although the amplitude value once dropped to a level lower than the regulation voltage, the amplitude value has risen to a level equal to or higher than the regulation voltage before the regulation time elapses, in step S205, the power failure detector 4 determines that no power failure is occurring (no power failure state). As an example of an instance where although the amplitude value once dropped to a level lower than the regulation voltage, the amplitude value has risen to a level equal to or higher than the regulation voltage before the regulation time elapses, there is an instantaneous power failure. In the instantaneous power failure, since the motor controller can be operated normally, the power failure detector 4 determines that no power failure is occurring.

On the other hand, when the amplitude value is lower than the regulation voltage, and the continuation of this state exceeds the regulation time, in step S206, the power failure detector 4 determines that a power failure is occurring. When the power failure is determined to be occurring, the power failure detector 4 notifies (inputs to) the inverter 2 of a command (protection operation start command) to start a protection operation for the machine.

Next, in step S207, the inverter 2 starts the protection operation for the machine. After that, in step S208, the motor controller 101 controls the motor and the peripheral devices thereof for driving the machine to stop the machine.

The motor controller 101 or 102 according to the first or second embodiment of the present invention may further include a power failure detection condition memory 6. The power failure detection condition memory 6 stores the determined regulation time and the regulation voltage. The power failure detection condition determiner 5 and the power failure detection condition memory 6 may be provided in a host controller (not shown) for controlling the motor controller 101 or 102, or in the rectifier 1.

As described above, the motor controller according to the second embodiment of the present invention can flexibly modify the time until the detection of a power failure depending on the "power failure tolerance" of the machine, while preventing problems such as an increase in cost and size owing to a complicated circuit configuration. As a result, it is possible to determine or modify the power failure detection time optimally depending on the machine, and, when a power supply voltage drops, minimize the frequency of stopping the machine, thus improving the availability of the machine.

What is claimed is:

1. A motor controller comprising:
a rectifier for converting alternating-current (AC) power supplied from an AC power supply into direct-current (DC) power and outputting the DC power;
an AC voltage detector for detecting an AC voltage value of the AC power supply and outputting the AC voltage value as a detection value;
a power failure detector for determining that a power failure is occurring, when a state in which the outputted detection value is equal to or lower than a regulation voltage has continued for a regulation time or more;
a power failure detection condition determiner for determining or modifying the regulation time; and
an inverter for converting the DC power outputted from the rectifier into desired AC power,
wherein upon detecting the power failure, the power failure detector inputs a protection operation start command to the inverter, the protection operation start command is a command to start a protection operation for a machine using the motor controller,
wherein the regulation time $T_0$ is determined by an upper limit $T_1$ of the regulation time (upper limit regulation time) represented by the following equation:

$0 < T_0 < T_1$ where $T_1 = T_3 - T_2$, $T_2$: a certain time required between a start of the protection operation and a stop of the machine, $T_3$: a time between the detection by the power failure detector of the voltage drop state in which the detection value of the power supply voltage is lower than the regulation voltage and the stop of the machine, and wherein the power failure detection condition determiner determines the regulation time depending on the power failure tolerance which is an amount of energy required for continuing the normal operations of the motor controller and peripheral devices thereof.

2. The motor controller according to claim 1, wherein the power failure detection condition determiner modifies the regulation time depending on a power supply voltage supplied from the AC power supply.

3. The motor controller according to claim 1, wherein the power failure detection condition determiner determines the regulation voltage depending on the power failure tolerances of the motor controller and peripheral devices thereof.

* * * * *